United States Patent [19]

Keiper, Jr.

[11] Patent Number: 4,821,287

[45] Date of Patent: Apr. 11, 1989

[54] APPARATUS AND METHOD FOR DETECTING DIGITAL CARRIER SYNCHRONIZATION PROBLEMS

[75] Inventor: Francis P. Keiper, Jr., Sunnyvale, Calif.

[73] Assignee: F. L. Jennings, Menlo Park, Calif.

[21] Appl. No.: 111,775

[22] Filed: Oct. 21, 1987

[51] Int. Cl.$^4$ ............................................. H04B 3/46
[52] U.S. Cl. ..................................... 375/10; 375/113; 328/133
[58] Field of Search ................... 375/3, 3.1, 4, 10, 52, 375/100, 101, 102, 113; 307/524, 525; 329/112, 110; 324/79 R, 82; 328/133

[56] References Cited

U.S. PATENT DOCUMENTS

| | | | |
|---|---|---|---|
| 3,518,680 | 6/1970 | McAuliffe | 375/52 |
| 4,376,309 | 3/1983 | Fenderson et al. | 375/101 |
| 4,625,238 | 11/1986 | Penny | 375/10 |
| 4,627,080 | 12/1986 | Debus, Jr. | 375/101 |
| 4,700,366 | 10/1987 | Henriksson | 375/100 |
| 4,701,935 | 10/1987 | Namiki | 375/4 |

Primary Examiner—Robert L. Griffin
Assistant Examiner—Stephen Chin
Attorney, Agent, or Firm—Christie, Parker & Hale

[57] ABSTRACT

Phase slippage of a test clock signal and the direction of such slippage are digitally detected, accumulated, and displayed and/or recorded. A test clock signal is recovered from one digital carrier signal. A reference clock signal is recovered from another digital carrier signal. From the test clock signal, first and second binary signals are generated at a frequency phase synchronized to the test clock signal. The second signal is shifted in phase from the first signal. Responsive to the reference clock signal, the states of the first and second signals are repeatedly sampled such that the sampled states are representative of the phase relationship between the test clock signal and the reference clock signal. Successive samples of the states of the first and second signals are compared to detect unit interval phase shifts between the test clock signal and the reference clock signal. The phase shifts detected by the comparison are accumulated at successive samples are compared to represent phase slippage. An annular display of lamps that facilitates observation of the accumulated slippage.

20 Claims, 4 Drawing Sheets

APPARATUS AND METHOD FOR DETECTING DIGITAL CARRIER SYNCHRONIZATION PROBLEMS

BACKGROUND OF THE INVENTION

This invention relates to digital carrier transmission, and more particularly to an apparatus and method for detecting digital carrier synchronization problems.

Digital carrier systems are widely used to transmit data and PCM encoded voice signals over telephone lines. The T1 carrier system, for example, transmits 24 channels of 8-bit information formatted in frames—each frame consists of 192 information bit positions, i.e. time slots, and a framing pulse at a transmission rate of 1.544 megaHertz (mHz). Digital carrier signals typically exhibit phase jitter and wander relative to a timing reference clock, even when properly synchronized to the reference clock. Sometimes digital carrier signals become unsynchronized with the timing reference clock and start to slip in phase continuously with respect thereto, ultimately resulting in degradation in the transmission or loss of the transmitted information. Digital carrier data, as distinguished from PCM encoded voice, transmission over telephone lines is particularly vulnerable to loss of information, and thus, to creation of serious errors in the transmitted data.

One technique to analyze the extent of digital carrier signal slippage and to detect synchronization problems is to compare a clock signal derived from the signal under test with a reference clock signal visually on an oscilloscope display synchronized to the reference clock signal. It is difficult to distinguish continuous slippage from jitter and wander in this way. As a result, synchronization problems may go undetected from inspection of the oscilloscope display.

SUMMARY OF THE INVENTION

According to the invention, phase slippage of a test clock signal and the direction of such slippage are digitally detected, accumulated, and displayed and/or recorded. In this way, slippage is distinguished from phase jitter and wander. Specifically, a test clock signal is recovered from one digital carrier signal. A reference clock signal is recovered from another digital carrier signal. Both digital carrier signals operate at the same nominal clock frequency. From the test clock signal, first and second binary signals are generated at a frequency phase synchronized to the test clock signal. The second signal is shifted in phase from the first signal. Responsive to the reference clock signal, the states of the first and second signals are repeatedly sampled such that the sampled states are representative of the phase relationship between the test clock signal and the reference clock signal. Successive samples of the states of the first and second signals are compared to detect unit interval phase shifts between the test clock signal and the reference clock signal. The phase shifts detected by the comparison are accumulated as successive samples are compared to represent phase slippage. As a result, jitter and wander do not accumulate with the slippage.

A feature of the invention is an annular display of lamps that facilitates observation of the accumulated slippage. In the case of T1 carrier, the display preferably comprises two rings of lamps and a single lamp. One ring of sixteen lamps displays the accumulation of one to sixteen increments of unit interval slippage, and the other ring of twelve lamps displays the number of increments of twelve unit interval slips accumulated. After the accumulation of one hundred ninety-two slips, the next slip is displayed on the single lamp, which represents the slippage of a full frame of the test clock signal.

Another feature of the invention is a counter to register full frame slips, preferably in both directions.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
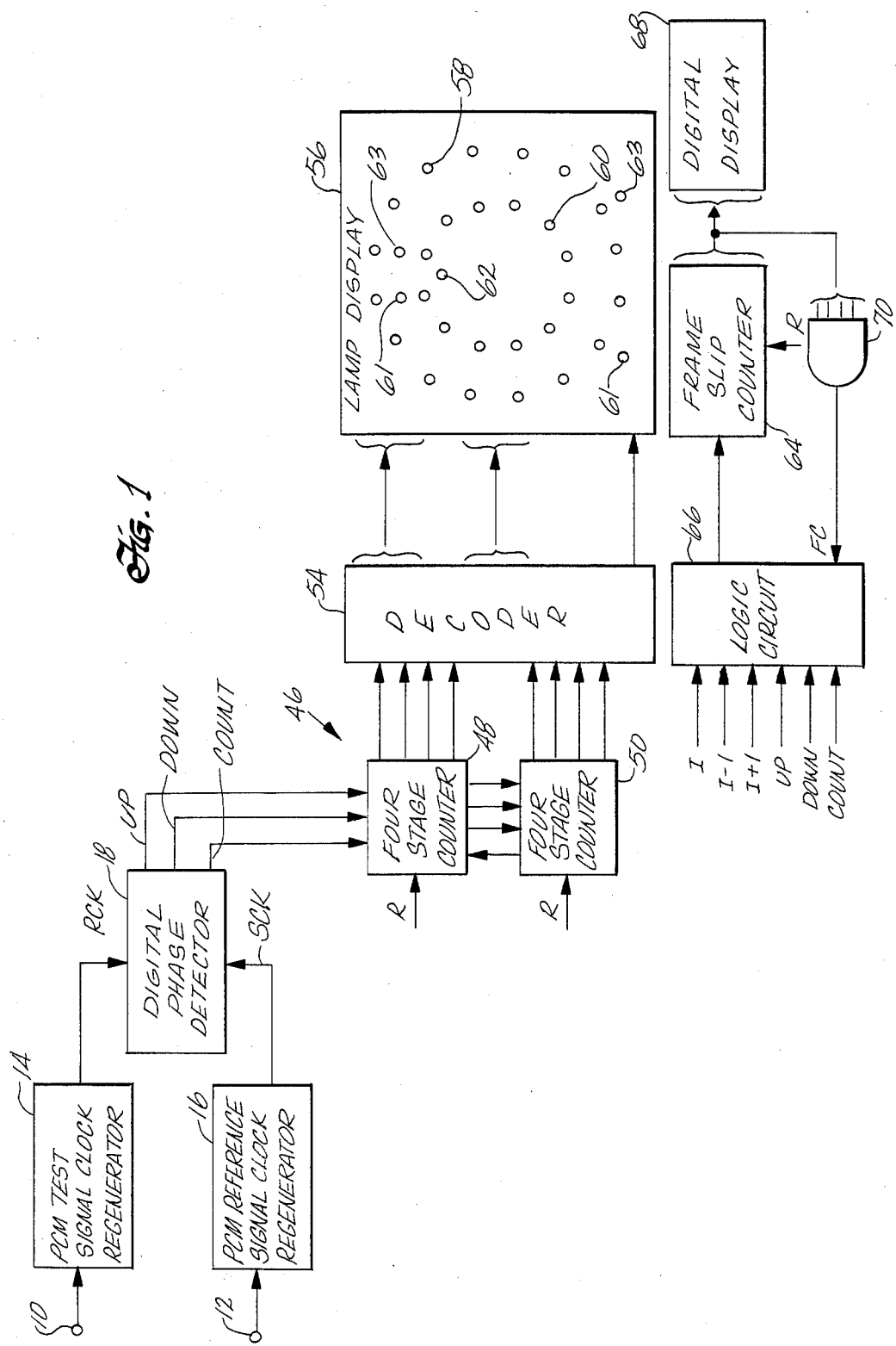
FIG. 1 is a schematic block diagram of apparatus for detecting digital carrier clock synchronization problems in accordance with principles of the invention.

In FIG. 1, a digital carrier signal to be tested is applied to an input terminal 10, and a digital carrier reference signal is applied to an input terminal 12. By way of example, the digital carrier test signal could be the incoming signal at a T1 carrier repeater, and the digital carrier reference signal could be the outgoing signal at the repeater. Input terminal 10 is connected to a test signal clock regenerator 14, which recovers from the digital carrier test signal a test clock signal (RCK). Input terminal 12 is connected to a reference signal clock regenerator 16, which recovers from the digital carrier reference signal a reference clock signal (SCK). Typically, regenerators 14 and 16 could comprise a narrow-band filter having a Q of the order of one hundred, and a shaping circuit to form a binary signal from the filtered signal. If the digital carrier signals are alternate mark inversion signals (AMI), as in the case of T1 carrier, the digital carrier signals are first squared or doubled so unipolar pulses are applied to the narrow-band filters. Instead of recovering the reference clock signal from one of the signals being transmitted by the digital carrier system under test, the reference clock signal could be the output of a highly stable system clocking oscillator. The test clock signal (RCK) and reference clock signal (SCK) are applied to a digital phase detector 18.

Figure 2:
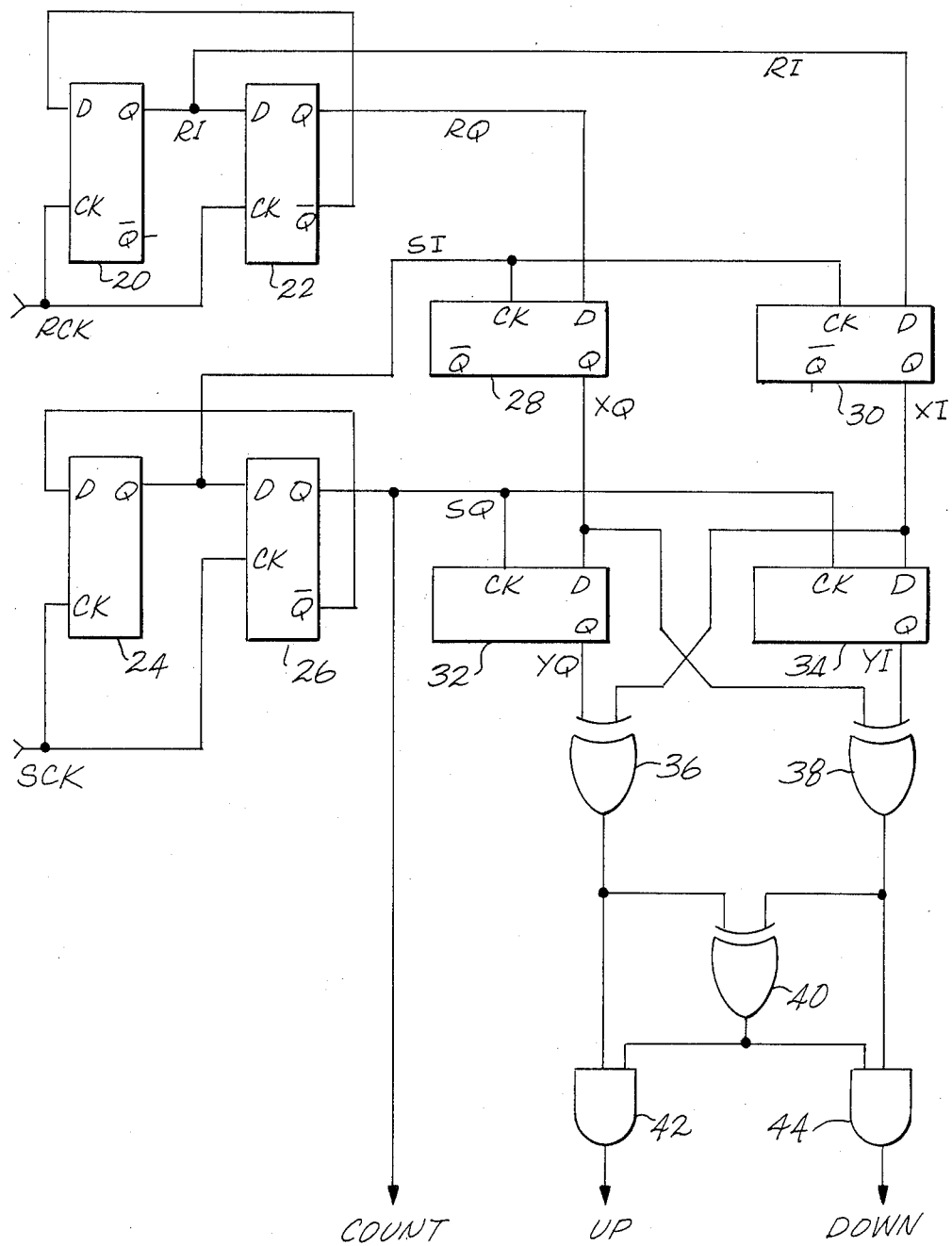
FIG. 2 is a schematic circuit diagram of the digital phase detector of FIG. 1.

As shown in FIG. 2, detector 18 comprises D-registers 20, 22, 24, 26, 28, 30, 32 and 34 and logic circuitry described in detail below. The test clock signal (RCK) is coupled to the CK input of registers 20 and 22. The Q output of register 20 is coupled to the D input of register 22. The $\bar{Q}$ output of register 22 is connected to the D input of register 20. As a result, registers 20 and 22 frequency divide the test clock signal by four and produce a binary signal RI at the Q output of register 20, and a binary signal RQ at the Q output of register 22. Signals RI and RQ are in quadrature phase relationship. Binary signal RI leads binary signal RQ in phase by 90°. Binary signals RI and RQ are synchronized to the test clock signal in the sense that they occur at one-fourth the frequency in fixed phase relationship therewith. The reference clock signal (SCK) is coupled to the CK input of registers 24 and 26. The Q output of register 24 is coupled to the D input of register 26. The $\overline{Q}$ output of register 26 is connected to the D input of register 24. As a result, registers 24 and 26 frequency divide the test clock signal by four and produce a binary signal SI at the Q output of register 24 and a binary signal SQ at the Q output of register 26. In this example, signals SI and SQ are in quadrature phase relationship. Binary SI leads binary SQ in phase by 90°.

Figure 3:
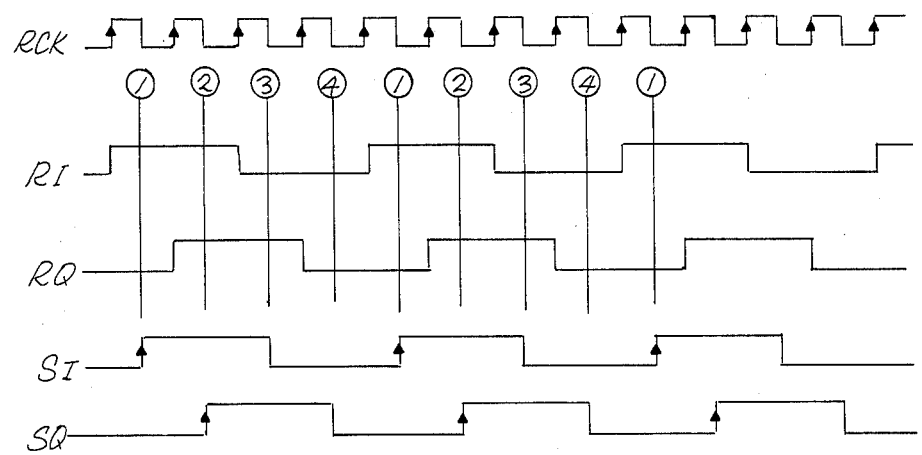
FIG. 3 is a wave form diagram illustrating the operation of the digital phase detector of FIG. 2.

Reference is made to FIG. 3 for an illustration of the relationship among the test clock signal (RCK) and binary signals RI and RQ, and for the relationship among binary signals RI and RQ and binary signals SI and SQ. The leading edge of binary signal SI can occur anywhere relative to binary signals RI and RQ. FIG. 3 simply illustrates one of an infinite number of possibilities between 0° and 360°.

Binary signal SI is coupled to the CK input of registers 28 and 30 (FIG. 2). Binary signal RQ is coupled to the D input of register 28. Binary signal RI is coupled to the D input of register 30. Registers 28 and 30 serve to sample the states of binary signals RQ and RI, respectively, repeatedly at each leading edge of binary signal SI. Binary signal SQ is coupled to the CK input of registers 32 and 34.

The Q output of register 28, at which a binary signal XQ appears, is coupled to the D input of register 32. The Q output of register 30, at which a binary signal XI appears, is coupled to the D input of register 34. Registers 32 and 34 serve to sample the states of registers 28 and 30 90° in phase after registers 28 and 30 sample binary signals RQ and RI. The next time that binary signals RQ and RI are sampled at the leading edge of binary signal SI, two sets of samples are stored—a set of present samples in registers 28 and 30 and a set of previous samples in registers 32 and 34. Thus, successive samples of the states of binary signals RQ and RI are stored in registers 28 and 30 and in registers 32 and 34, respectively on a continuous basis during operation of the described apparatus. At the Q output of register 32, a binary signal YQ appears and at the Q output of register 34 a binary signal YI appears. Binary signals YQ and YI represent the previous states of the sampled binary signals RQ and RI, while binary signals XQ and XI represent the present states of the sampled binary signals RQ and RI.

The previously sampled states of binary signals RQ and RI are compared with the presently sampled states of binary signals RQ and RI in logic circuitry comprising exclusive OR gates 36, 38 and 40 and AND gates 42 and 44 to detect unit interval phase shifts of the test clock signal relative to the reference clock signal. Signal YQ and signal XI are applied to the inputs of exclusive OR gate 36. Signals XQ and YI are applied to the inputs of exclusive OR gate 38. The outputs of exclusive OR gates 36 and 38 are coupled to the inputs of exclusive OR gate 40. The output of exclusive OR gate 36 and the output of exclusive OR gate 40 are coupled to the inputs of AND gate 42. The outputs of exclusive OR gate 38 and exclusive OR gate 40 are coupled to the inputs of AND gate 44. When the output of AND gate 42 is high, it produces an UP signal for a slippage accumulating counter described below in connection with FIG. 1. When the output of AND gate 44 is high, it produces a DOWN signal for the slippage accumulating counter. When the state of signal SQ goes high, a COUNT signal transition for incrementing the slippage accumulating counter is produced and the states of registers 28 and 30 are transferred to registers 32 and 34, respectively.

Figure 4:
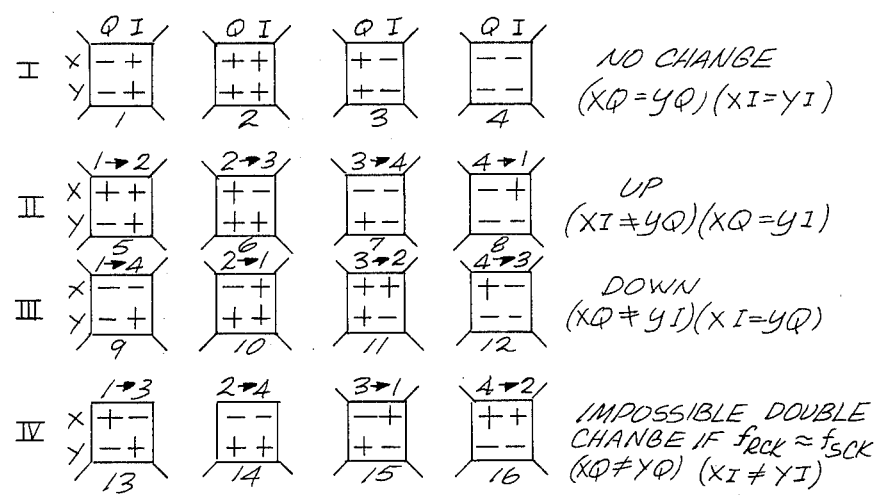
FIG. 4 is a diagram illustrating the permutations of states of the registers in FIG. 2 used for sample comparison.

FIG. 4 depicts the permutations of states of signals XQ, XI, YQ, and YI, which are compared in the above-described logic circuitry. The permutations are represented by truth tables numbered 1 to 16 as "+" for high and "−" for low. The term "unit clock interval" as used herein refers to a phase shift of one complete clock cycle, i.e. the period of signal RCK. The case of no phase shift, i.e. a phase shift less than the unit clock interval, between the previously sampled states and the present states is depicted in row I. The states of signals XQ and XI vary depending upon the initial phase of signal SI relative to signals RI and RQ. With reference to FIG. 3, four different times of the leading edge of signal SI relative to signals RI and RQ are represented by vertical lines 1, 2, 3 and 4 passing through RI and RQ. These vertical lines are separated from each other by a unit clock interval. When the leading edge of signal SI occurs at a time 1, signal XQ is low and signal XI is high, as depicted in truth table 1. When the leading edge of signal SI occurs at a time 2, signal XQ is high and signal XI is high, as depicted in truth table 2. When the leading edge of signal SI occurs at a time 3, signal XQ is high and signal XI is low as depicted in truth table 3. When the leading edge of signal SI occurs at a time 4, signal XQ is low and signal XI is low, as depicted in truth table 4. When no phase shift occurs, the previous states represented by signals YQ and YI are the same as the present states represented by signals XQ and XI. In other words XQ=YQ and XI=YI as shown in row I.

If the previously sampled state was at time 1 and the test clock signal then slips relative to the reference clock signal in a leading direction by a unit clock interval so the leading edge of signal SI occurs at time 2, the presently sampled states of signals RQ and RI both become high so signals XQ and XI are high, as depicted in truth table 5. Above truth table 5, the notation 1 → 2 illustrates slippage of the test clock signal in a leading direction relative to the reference clock signal. Truth tables 6, 7, and 8 illustrate the same slippage for times 2, 3, and 4. In this case, the states of signals XI and YQ differ and the states of signals XQ and YI are the same, i.e. XI≠YQ and XQ=YI. In terms of truth tables 5 to 8, the lower left to upper right diagonals are opposite and the upper left to lower right diagonals are the same. For the permutations shown in row II, an UP signal is generated for the slippage accumulating counter.

If the previously sampled state was at time 1 and the test clock signal slips relative to the reference clock signal in a lagging direction by a unit clock interval so the leading edge of signal SI occurs at time 4, the presently sampled states of signals RQ and RI both become low so signals XQ and XI are low as depicted in truth table 9. Above truth table 9, the notation 1 → 4 illustrates slippage of the test clock signal in a lagging direction relative to the reference clock signal. Truth tables 10, 11, and 12 illustrate the same slippage for times 2, 3, and 4. In this case, the states of signals XI and YQ are the same and the states of signals XQ and YI differ, i.e. XI=YQ and XQ≠YI. In terms of truth tables 9 to 12, the lower left to upper right diagonals are the same and the upper left to lower right diagonals are opposite. For the permutations shown in row III, a DOWN signal is generated for the slippage accumulating counter.

Truth tables 13 to 16 of row IV, included only to show the complete sixteen permutations possible, represent slippage of two unit clock intervals between successive samples. This is treated as an impossible condition because of the stability of the clocks used to generate commercial digital carrier signals. In other words, the test clock signal and the reference clock signal are nominally at the same frequency and are sufficiently close to each other to prevent this condition.

Viewed differently, registers 28 and 30 function as digital phase detectors in the sense that they produce a binary indication of the relative phase between signals SI and RQ and signals SI and RI. Registers 32 and 34 store the previous binary indications of these phase detectors for comparison purposes on an ongoing basis at a sampling rate equal to the frequency of signal SI. Sampling and comparing signals at different phases, i.e. signals RI and RQ in quadrature phase relationship, permits detection of the direction of phase shift, i.e. change. The digital phase detector provides one indication, "no count," for phase shifts less than the unit clock interval, a second indication, "count up," for phase shifts greater than the unit clock interval in one direction, e.g. leading and a third indication, "count down," for phase shifts greater than the unit clock interval in the other direction, e.g. lagging.

With reference to FIG. 1, the UP, DOWN and COUNT signals generated by digital phase detector 18 are applied to a bi-directional recyclable slippage accumulating counter 46 comprising a four stage binary counter 48 and a four stage binary counter 50.

The low to high transitions of signal SQ (FIG. 2) comprise the COUNT signal. If the UP signal is high when the COUNT signal goes high, counter 46 increments one state. If the DOWN signal is high when the COUNT signal goes high, counter 46 decrements one state. If neither the UP or DOWN signals are high when the COUNT signal goes high, counter 46 remains in the same state. By virtue of its bi-directional operation, counter 46 accumulates unit clock interval phase shifts and ignores phase jitter and wander. Thus, if the phase of the test clock signal shifts in one direction by one or more unit clock intervals and then returns in the other direction to its original phase, counter 46 returns to its original state as well.

Figure 6:
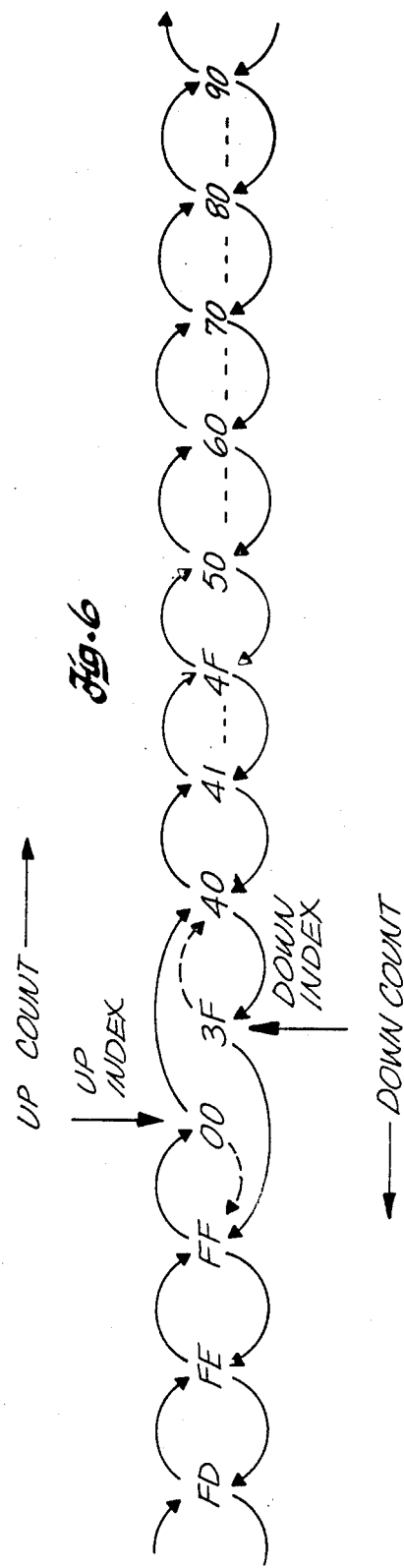
FIG. 6 is a chart illustrating the sequence of the slippage accumulating counter of FIG. 1.

An exemplary implementation of counter 46 will now be described in terms of its sequence of states as illustrated in FIG. 6. Counters 48 and 50 each have sixteen states designated as 0, 1, 2, 3, 4, 5, 6, 7, 8, 9, A, B, C, D, E, and F. However, counter 50 only uses fourteen of the states—states 1 and 2 remain unused. In the chart of FIG. 6, the right-hand digit of each number represents the state of counter 48 and the left-hand digit of each number represents the state of counter 50. At the beginning of operation, counter 46 is reset to state 00, the up index. Starting from the up index, counter 46 increments, i.e. counts up, to states 40, 41, . . . 4F. Counter 46 next increments up to states 50, 51, . . . 5F. In similar fashion counter 46 increments through states 60 to 6F, 70 to 7F, 80 to 8F, 90 to 9F, A0 to AF, B0 to BF, C0 to CF, D0 to DF, E0 to EF, and F0 to FF. Then counter 46 increments from state FF to state 00, the up index state. If counter 46 increments through only part of the described cycle and then decrements, i.e. counts down, it passes from state 40 to state 3F, which serves as the down index. From state 3F counter 46 increments again to state 40. Starting from reset, when counter 46 decrements, i.e. counts down, it follows the opposite sequence, i.e. it decrements to state FF from state 00, from state FF to state F0, from state EF to state E0, etc. At state 40, counter 46 decrements to state 3F, the down index. If counter 46 decrements through only part of its count down cycle and then increments again, i.e. counts up, it passes from state FF to state 00, the up index. Thus, when incrementing from state 00, the up index, counter 46 skips state 3F and passes to state 40, and when decrementing from state 3F, the down index, counter 46 skips state 00 and passes directly to state FF.

Figure 5:
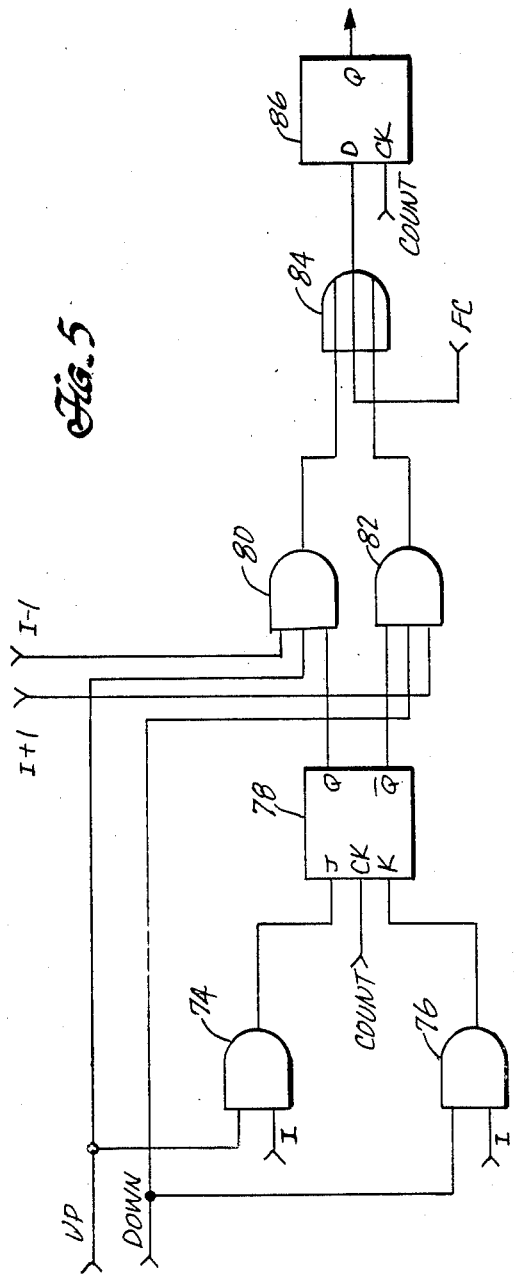
FIG. 5 is a schematic circuit diagram of the logic circuit of FIG. 1.

The stages of counters 48 and 50 are coupled to a decoder 54. A lamp display 56 has an outer ring 58 of sixteen lamps, an inner ring 60 of twelve lamps, a pair of current direction indicating lamps 61 and 63, and a single lamp 62. Lamps 58, 60, 61, 62 and 63 could each be a light emitting diode (LED). To facilitate observation of display 56, lamps 60 are preferably a different color from lamps 58, e.g. lamps 58 could be red and lamps 60 could be green. Decoder 54 comprises a plurality of AND gates to which various combinations of the stages of counters 48 and 50 are coupled in accordance with the counter sequence table of FIG. 6. The four stages of counter 48 are coupled to sixteen AND gates in different combinations. The outputs of these AND gates actuate the individual lamps of ring 58 such that only one is lit at a time and all lamps are blanked by inhibit logic in the up and down index states. Different combinations of the four stages of counter 50 are coupled to twelve AND gates which actuate the respective lamps of ring 60 so only one is lit at a time. Different combinations of the stages of counter 50 are coupled to AND gates which actuate lamp 62 and generates index signal I at the up and down index states. The $\overline{Q}$ output of J-K register 78 described below in FIG. 5 is coupled to lamp 61 to actuate that lamp when counter 46 is counting down. The Q output of register 78 is coupled to lamp 63 to actuate that lamp when counter 46 is counting up. Lamps 61 and 63 are also blanked by inhibit logic in the up and down index states. Display 56 can be analogized to the face of a clock. The lit lamp of ring 58 is the "minute hand". The lit lamp of ring 60 is the "hour hand". Rings 58 and 60 thus display the slippage of 1 to 192 unit clock intervals and lamp 61 or lamp 63 displays the direction of phase slippage from the last index, i.e., leading or lagging, after which lamp 62 becomes lit for one unit interval. At any given time either one lamp of ring 58 and one lamp of ring 60 are lit or lamp 62 is lit. At the beginning of operation, counter 46 is reset and lamp 62 is lit. Slippage of the test clock signal in one direction, e.g. leading, relative to the reference clock signal causes the lit lamps of rings 58 and 60 to progress in a clockwise direction. Slippage of the test clock signal in the other direction, e.g. lagging, relative to the reference clock signal causes the lit lamps of rings 58 and 60 to progress in a counterclockwise direction. Accordingly, the slippage can be observed in real time by inspecting display 56.

Each time a full frame slip occurs, i.e. 193 unit clock interval slips, a frame slip counter 64 is incremented. Counter 46 is coupled through a logic circuit 66 to the count input of counter 64. As described below in connection with FIG. 5, logic circuit 66 transmits a count signal to counter 64 only after counter 46 counts through a complete cycle from the index state and returns to the index state. As a result, successive transitions of counter 46 through its index state in different directions are not registered by counter 64. Counter 64 is coupled to a digital display 68 which presents a reading of the state of counter 64, preferably in decimal form. The stages of counter 64 are also coupled through an AND gate 70 as a signal FC to logic circuit 66 to prevent further increment of counter 64 after it reaches its count capacity, thereby preventing counter 64 from recycling.

As illustrated in FIG. 5, logic circuit 66 comprises AND gates 74, 76, 80 and 82, a J-K register 78, an OR gate 84 and a D-register 86. The UP signal from phase detector 18 and index signal I are applied to the inputs of AND gate 74. The DOWN signal from phase detector 18 and index signal I are applied to the inputs of AND gate 76. The output of AND gate 74 is connected to the J input of register 78, the output of AND gate 76 is connected to the K input of register 78, and the COUNT signal (FIG. 2) is applied to the CK input of register 78. A signal called herein I−1 is representative of the state of counter 46 directly below the index state (state FF in FIG. 6) and a signal called herein I+1 is representative of the state of counter 46 directly above the index state (state 40 in FIG. 6). Thus, when counter 46 is counting up, signal I−1 is high immediately before the index state and when counter 46 is counting down signal I+1 is high directly before the index state. Signals I−1 and I+1 may be taken from the outputs of appropriate AND gates in decoder 54. The Q output signal from register 78, the UP signal from phase detector 18 and the I−1 signal are applied to the inputs of AND gate 80. The $\overline{Q}$ output signal from register 78, the DOWN signal from phase detector 18 and signal I+1 are applied to the inputs of AND gate 82. The outputs of AND gates 80 and 82 and the output of AND gate 70 (FIG. 1) are coupled to the inputs of OR gate 84. The output of OR gate 84 is connected to the D input of register 86. The COUNT signal (FIG. 2) is applied to the CK input of register 86. When output signal Q of register 86 goes high, counter 64 is incremented. Register 78 records the direction of counter 46 the previous time it left the index state and only permits counter 64 to increment if counter 46 is counting in the same direction at the occurrence of the present index state, which indicates that the counter has cycled through a full frame of 193 counts in the same direction. Under such circumstances the appropriate AND gate (80 or 82) goes high at the state immediately preceding the present index state and the Q output of register 86, which goes high responsive to the transition of signal SQ, increments counter 64. When counter 64 reaches its count capacity, the output signal from AND gate 70 (FIG. 1) becomes high. This signal is applied through OR gate 84 to the D input of register 86 to hold output signal Q high. This prevents further incrementing of counter 64.

Considering the operation of logic circuit 66 starting from the index state after reset, if counter 46 counts up, the Q output signal from register 78 becomes high. If counter 46 continues to count up, as it reaches the state below the index state, signal I−1 becomes high and the Q output signal from register 86 goes high the next time the COUNT signal goes high. If counter 46 instead counts down again to the index state, the D input of register 86 remains low.

On the other hand, if counter 46 counts down after reset, the $\overline{Q}$ output signal from register 78 becomes high. If counter 46 continues to count down, as it reaches the state above the index state, signal I+1 becomes high, and the Q output signal from register 86 becomes high the next time the COUNT signal goes high.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, phase detector 18 could operate directly upon the test clock signal and reference clock signal in which case another phase component of the test clock signal would have to be generated. In general, selection of a quadrature phase relationship to the test clock signal is a matter of convenience. Instead of signals RI and RQ, component signals in other phase relationships could be employed in phase detector 18. Similarly, the selection of a quadrature phase relationship to the reference clock signal is a matter of convenience; the only function of signal SQ is to control the timing of the counting, sampling and shifting of information in a coordinated manner. Other display arrangements could also be employed, depending upon the format of the digital carrier signals being monitored. If desired, the states of slippage aggregating counter 46 and frame slip counter 64 could be recorded on disc or tape for diagnostic or analytical purposes. Under some circumstances it may be desirable to detect and/or count unit clock interval phase shifts irrespective of direction; in such case only one signal synchronized to the test clock signal, e.g. signal RI is required. In other circumstances it may be desirable to count the unit clock interval phase shifts in each direction separately rather than accumulating them, or to simply indicate such phase shifts on a display.

What is claimed is:

1. Apparatus for detecting digital carrier synchronization problems comprising:
   means for recovering a test clock signal from a digital carrier signal;
   a source of a reference clock signal operating at the same nominal frequency as the test clock signal;
   means for generating from the test clock signal first and second binary signals at a frequency synchronized to the test clock signal, the second signal being shifted in phase from the first signal;
   means responsive to the reference clock signal for repeatedly sampling the states of the first and second signals such that the sampled states are representative of the phase relationship between the clock signals;
   means for storing successive samples of the states of the first and second signals;
   means for comparing the stored successive samples to detect phase slippage between the digital carrier signals; and
   means for accumulating unit interval clock phase shifts detected by the comparing means as successive samples are compared.

2. The apparatus of claim 1, in which the sampling means comprises:
   first and second D-registers each having a D input;
   means for applying the first signal to the D input of the first register;
   means for applying the second signal to the D input of the second register; and
   means for response to the reference clock signal for clocking the first and second registers to sample the states of the first and second signals, respectively.

3. The apparatus of claim 2, in which the storing means comprises:

third and fourth D-registers each having a D input;
means for coupling the first register to the D input of the third register;
means for coupling the second register to the D input of the fourth register; and
means responsive to the reference clock signal for clocking the third and fourth registers to transfer the states of the first and second registers to the third and fourth registers, respectively.

4. The apparatus of claim 1, additionally comprising a display of lamps and means for selectively lighting the lamps to uniquely represent different amounts of phase slippage.

5. The apparatus of claim 1 in which the source comprises means for recovering the reference clock signal from another digital carrier signal.

6. The apparatus of claim 1 in which the accumulating means comprises a bi-directional recyclable counter having a capacity of n states, means for incrementing the counter upon each occurrence of a unit interval clock phase shift in one direction and means for decrementing the counter for each occurrence of a unit interval clock phase shift of the other direction.

7. The apparatus of claim 6 additionally comprising a uni-directional counter and means for incrementing the uni-directional counter each time the bi-directional counter changes n states in the same direction.

8. The apparatus of claim 3, in which the comparing means comprises means for comparing the states of the first, second, third and fourth registers.

9. The apparatus of claim 3, in which the comparing means comprises first means for comparing the states of the first and third registers, second means for comparing the states of the second and fourth registers, and means for generating a unit interval clock phase shift indicative signal when one, and only one, of the first comparing means or the second comparing means indicates that the registers being compared have different states.

10. The apparatus of claim 9, in which the comparing means additionally comprises third means for comparing the states of the first and fourth registers, fourth means for comparing the states of the second and third registers, means for generating a signal indicating a unit interval clock phase shift in one direction when the third comparing means indicates that the first and fourth registers have different states while the fourth comparing means indicates that the second and third registers have the same state, and means for generating signal indicating a unit interval clock phase shift in the other direction when the fourth comparing means indicates that the second and third registers have different states and the third comparing means indicates that the first and fourth registers have the same states.

11. The apparatus of claim 9, additionally comprising:
first means for sensing the direction from which the accumulating counter approaches the first state;
second means for sensing the direction from which the accumulating counter leaves the first state;
third means for sensing the arrival of the accumulating counter at the first state;
a frame counter; and
means responsive to the first, second, and third sensing means for actuating the frame counter each time the accumulating counter arrives at the first state after having last left and approached the first state from the same direction.

12. A method for detecting slippage of first and second digital carrier signals at the same nominal frequency relative to each other, the method comprising the steps of:
recovering a first clock signal at a submultiple of the nominal frequency from the first digital carrier signal;
recovering a second clock signal at a submultiple of the nominal frequency from the second digital carrier signal;
generating a first binary signal the binary state of which represents the phase difference between the first and second clock signals;
storing the states of the first binary signal during successive periods of the submultiple of the nominal frequency; and
comparing the stored states of the first binary signal between successive periods to detect phase shifts between the first and second clock signals.

13. The method of claim 12, additionally comprising the steps of:
generating a third clock signal at the submultiple of the nominal frequency synchronized to the first clock signal with a given phase delay;
generating a second binary signal the binary state of which represents the phase difference between the second and third clock signals;
storing the states of the second binary signal during successive periods of the submultiple of the nominal frequency; and
comparing the stored states of the second binary signal between successive periods to detect the direction of phase shifts between the first and second clock signals.

14. Apparatus for analyzing digital carrier synchronization problems comprising:
means for recovering a test clock signal from one digital carrier signal;
means for recovering a reference clock signal from another digital carrier signal, both digital carrier signals operating at the same nominal clock frequency;
first means for detecting unit clock interval phase shifts between the clock signals;
second means for detecting the direction of such phase shifts;
a display of lamps that represent different unit clock interval phase shifts between the clock signals; and
means responsive to the first and second detecting means for actuating the lamps to indicate accumulated unit clock interval phase shifts.

15. The apparatus of claim 14, in which the display comprises a first group of lamps representing respective values of a least significant digit and a second group of lamps representing respective values of a higher order digit and the actuating means comprises means for sequentially actuating the first group of lamps individually for successive unit clock interval phase shifts in an order representative of the direction of such phase shifts and means for sequentially actuating the second group of lamps individually after each full actuation cycle of the first group of lamps in an order representative of the direction of cycling of the first group of lamps.

16. The apparatus of claim 15, in which the first group of lamps is arranged in an outer ring and the second group of lamps is arranged in an inner ring.

17. The apparatus of claim 16, in which the digital carrier signal is formatted in frames consisting of 192 information bit positions and a framing pulse, the first group comprises sixteen lamps and the second group comprises twelve lamps.

18. The apparatus of claim 17, additionally comprising an index lamp and means for actuating the index lamp when the lamps of the first and second group are not actuated.

19. Apparatus for recording digital carrier synchronization problems comprising:
   means for detecting unit interval clock phase shifts of a test clock signal from a reference clock signal;
   a bi-directional accumulating counter having a capacity of n states;
   means for changing the state of the counter one count responsive to each detected unit interval clock phase shift in a direction depending upon the direction of such unit interval clock phase shift;
   first means for sensing the direction from which the accumulating counter approaches one of its states;
   second means for sensing the direction from which the accumulating counter leaves the one state;
   third means for sensing the arrival of the accumulating counter at the one state;
   a frame counter; and
   means responsive to the first, second, and third sensing means for actuating the frame counter each time the accumulating counter arrives at the one state after having last left and approached the one state from the same direction.

20. The apparatus of claim 19, in which the one state is the first state.

* * * * *